(12) United States Patent  
Duale et al.

(10) Patent No.: US 9,811,339 B1  
(45) Date of Patent: *Nov. 7, 2017

(54) TESTING HYBRID INSTRUCTION ARCHITECTURE

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); Dennis W. Wittig, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,905

(22) Filed: Mar. 8, 2017

Related U.S. Application Data

(63) Continuation of application No. 15/273,850, filed on Sep. 23, 2016.

(51) Int. Cl.
  *G06F 11/22* (2006.01)
  *G06F 9/30* (2006.01)
  *G06F 11/36* (2006.01)

(52) U.S. Cl.
  CPC ...... *G06F 9/30145* (2013.01); *G06F 9/30072* (2013.01); *G06F 9/30181* (2013.01); *G06F 11/3688* (2013.01)

(58) Field of Classification Search
  CPC .......................... G06F 11/2205; G06F 11/263

USPC ........................................................... 714/33  
See application file for complete search history.

(56) References Cited

U.S. PATENT DOCUMENTS

| | | | |
|---|---|---|---|
| 8,769,495 B1* | 7/2014 | Gupta | G06F 11/3656 714/38.14 |
| 2004/0172519 A1* | 9/2004 | Nakajima | G06F 9/30076 712/209 |
| 2004/0193861 A1* | 9/2004 | Michaelis | G06F 9/5066 713/1 |

(Continued)

OTHER PUBLICATIONS

List of IBM Patents or Patent Applictions Treated As Related; (Appendix P), Filed Mar. 8, 2017, 2 pages.

(Continued)

*Primary Examiner* — Chae Ko  
(74) *Attorney, Agent, or Firm* — Cantor Colburn LLP

(57) ABSTRACT

A computer-implemented method for testing a hybrid architecture instruction set is provided. The method includes defining a first instruction definition table for a first base architecture, and defining a second instruction definition table for a second base architecture, wherein the first base architecture is different than the second base architecture. The method also includes defining a delta table, wherein the delta table defines architecture specific behavior, and generating a hybrid architecture table based on the delta table and at least one of the first instruction definition table or the second instruction definition table. The method includes executing a test based on the hybrid architecture table, wherein the hybrid architecture table is for a hybrid architecture that is compatible between the first base architecture and the second base architecture.

20 Claims, 7 Drawing Sheets

(56) References Cited

U.S. PATENT DOCUMENTS

| | | | | |
|---|---|---|---|---|
| 2005/0086566 A1* | 4/2005 | Thompson | .......... | G06F 17/5022 |
| | | | | 714/741 |
| 2006/0130016 A1* | 6/2006 | Wagner | ................ | G06F 9/4812 |
| | | | | 717/136 |
| 2008/0189528 A1* | 8/2008 | Robinson | ............ | G06F 11/2236 |
| | | | | 712/226 |
| 2010/0332808 A1* | 12/2010 | Adl-Tabatabai | ...... | G06F 9/3004 |
| | | | | 712/225 |
| 2013/0173893 A1* | 7/2013 | Hwa Chee | ................ | G06F 8/44 |
| | | | | 712/226 |
| 2015/0082289 A1* | 3/2015 | Leinfellner | ......... | G06F 11/3664 |
| | | | | 717/134 |
| 2016/0224448 A1* | 8/2016 | Park | ...................... | G06F 11/263 |

OTHER PUBLICATIONS

Ali Y. Duale, et al., Pending U.S. Appl. No. 15/273,850 entitled "Testing Hybrid Instruction Architecture," filed with the U.S. Patent and Trademark Office on Sep. 23, 2016.

* cited by examiner

TESTING HYBRID INSTRUCTION ARCHITECTURE

DOMESTIC PRIORITY

This application is a continuation of U.S. patent application Ser. No. 15/273,850, filed Sep. 23, 2016, the content of which is incorporated by reference herein in its entirety.

BACKGROUND

The present disclosure relates to testing instruction sets, and in particular, a system and methodology to test hybrid instruction architecture sets.

Test generation tools are used to generate test cases for the purpose of assuring the compliance of a machine implementation to its corresponding architecture. For the computer systems, a test case can be a set of computer instructions which drives the computer to produce specific results where the correctness of the produced results is determined by the test vehicle. Such test case can be built in pseudo-random manner. In addition, an effective test generation tool will build these test cases in an automated and dynamic fashion. With such test results, a tester will determine whether an implementation system or one of its features is working as it was originally established for it to do. Numerous test cases are simulated to reveal potential issues. As the software and hardware of a system are changed different test cases must be run to determine the reliability and stability of the system.

As legacy systems and software programs are phased out or as newer versions with architecture behavior are defined, present systems must be capable of supporting the legacy versions while simultaneously supporting the latest versions of the system and/or software. Hybrid architectures are utilized to provide compatibility between legacy versions and the latest versions. These hybrid architectures require testing to maintain the quality of the two versions when operating together.

SUMMARY

A computer-implemented method for testing a hybrid architecture instruction set is provided. The method includes defining a first instruction definition table for a first base architecture, and defining a second instruction definition table for a second base architecture, wherein the first base architecture is different than the second base architecture. The method also includes defining a delta table, wherein the delta table defines architecture specific behavior, and generating a hybrid architecture table based on the delta table and at least one of the first instruction definition table or the second instruction definition table. The method includes executing a test based on the hybrid architecture table, wherein the hybrid architecture table is for a hybrid architecture that is compatible between the first base architecture and the second base architecture.

In accordance with another embodiment, a computer program product for testing a hybrid architecture instruction set is provided. The computer readable storage medium having stored thereon first program instructions executable by a processor to cause the processor to define a first instruction definition table for a first base architecture, and define a second instruction definition table for a second base architecture, wherein the first base architecture is different than the second base architecture. Also, the computer program product defines a delta table, wherein the delta table defines architecture specific behavior and generates a hybrid architecture table based on the delta table and at least one of the first instruction definition table or the second instruction definition table. The computer program product executes a test based on the hybrid architecture table, wherein the hybrid architecture table is for a hybrid architecture that is compatible between the first base architecture and the second base architecture.

A system for testing a hybrid architecture instruction set is provided. The system includes a storage medium, the storage medium being coupled to a processor, and the processor configured to define a first instruction definition table for a first base architecture, define a second instruction definition table for a second base architecture, wherein the first base architecture is different than the second base architecture, and define a delta table, wherein the delta table defines architecture specific behavior. The system also includes generating a hybrid architecture table based on the delta table and at least one of the first instruction definition table or the second instruction definition table, and executing a test based on the hybrid architecture table, wherein the hybrid architecture table is for a hybrid architecture that is compatible between the first base architecture and the second base architecture.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
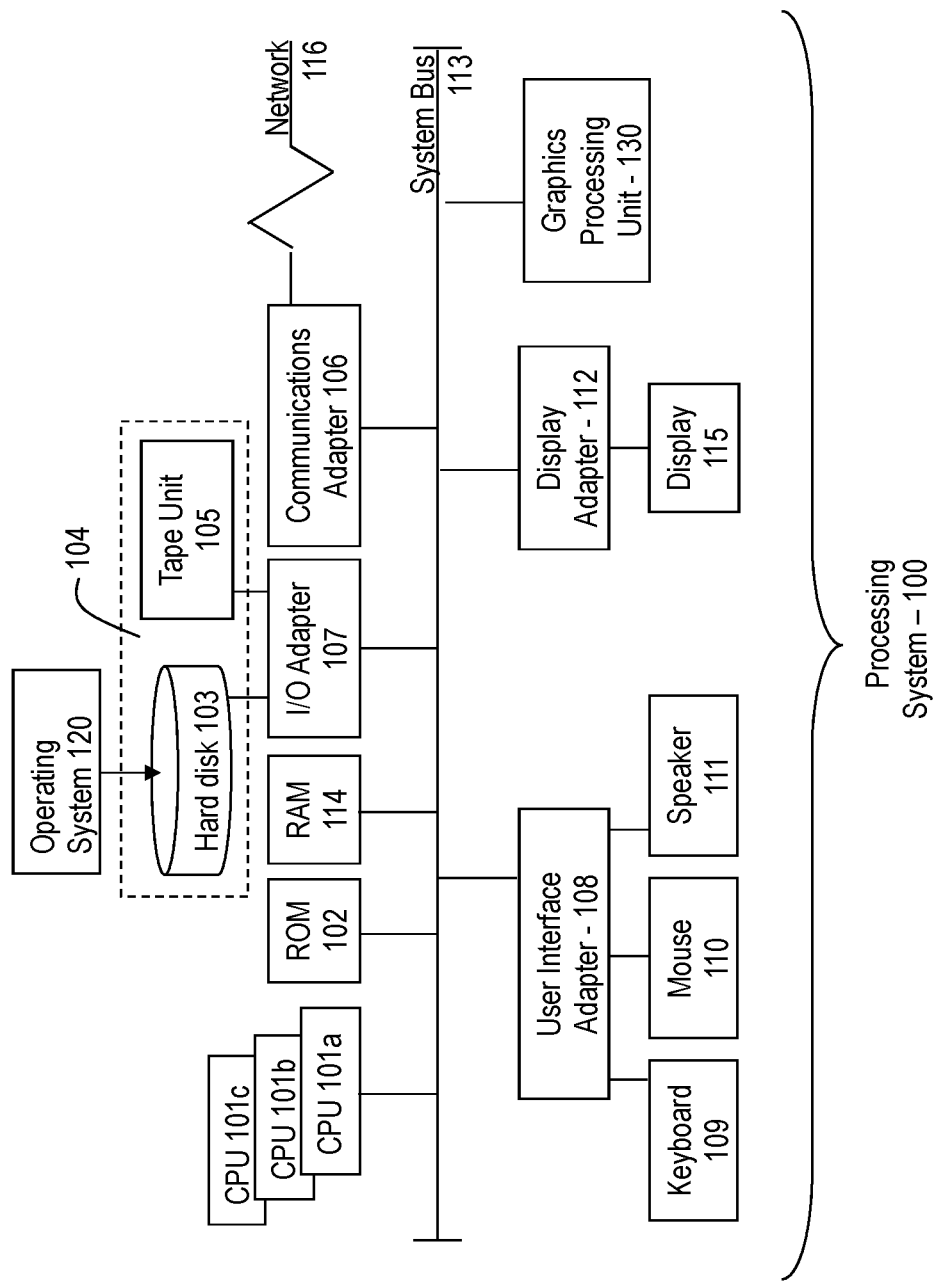
FIG. 1 is a block diagram illustrating one example of a processing system for practice of the teachings herein.

In accordance with one or more embodiments of the disclosure, computer-implemented methods, computer program products, and systems for testing a hybrid architecture instruction set is provided. The method includes defining a first instruction definition table for a first base architecture, and defining a second instruction definition table for a second base architecture, wherein the first base architecture is different than the second base architecture. The method also includes defining a delta table, wherein the delta table defines architecture specific behavior and generating a hybrid architecture table based on the delta table and at least one of the first instruction definition table or the second instruction definition table. The method includes executing a test based on the hybrid architecture table, wherein the hybrid architecture table is for a hybrid architecture that is compatible between the first base architecture and the second base architecture.

The challenge is to allow a test tool to dynamically and effectively (i.e., minimum maintenance) build test cases consisting of sets of machine instructions defined by different architectures; in other words, create test cases for a hybrid models. In one or more embodiments, a scalable and flexible means to test hybrid architectures is presented.

The machine language used in various architectures is a set of instructions executed directly by a computer's central processing unit (CPU), where each instruction performs a specific task. An instruction is comprised of an operation code followed by one or more operand nouns, where the operation code is the action while the operands are the data locations in memory to be acted upon or the program location in memory to switch to. An instruction set is an interface between a computer's software and its hardware.

The base table includes the basic definition of a machine instruction set for an architecture. In one or more embodiments, a plurality of base tables can be generated for a plurality of architectures. The different types of architectures include Enterprise System Architecture Model Extensions ESAME architectures, s/390 architectures, other System z architectures and the like.

In one or more embodiments, the delta table describes how the instructions of the base architecture will behave in the hybrid architecture. The hybrid architecture table includes machine instruction definition for the hybrid architecture. The hybrid table that is generated from the base table and the delta table contains the final set of machine instruction to be used for testing purposes, wherein the hybrid mode supports a compatible mode between multiple base architectures.

In one or more embodiments, the compatible mode architecture is the s/390 compatible-mode architecture which is a combination of two IBM z/system architectures, the s/390 architecture and the z/Architecture. The s/390 set of instructions and some z/Architecture instructions are supported in the s/390 compatibility mode. The s/390 compatibility mode allows some s/390 programs to be executed on the z/Architecture platform because the s/390 mode has been discontinued.

In one or more embodiments, a verification of the s/390 compatibility architecture is performed. In an example, the s/390 instructions are derived into a first base table and the z/Architecture instructions are derived into a second base table. The delta table is created to define the unique behavior of a set of instructions from either s/390 table or z/Architecture table or both. Finally, the hybrid instruction set is generated according to the base tables and delta table to create the final set of instructions to be supported in s/390-compatible mode.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
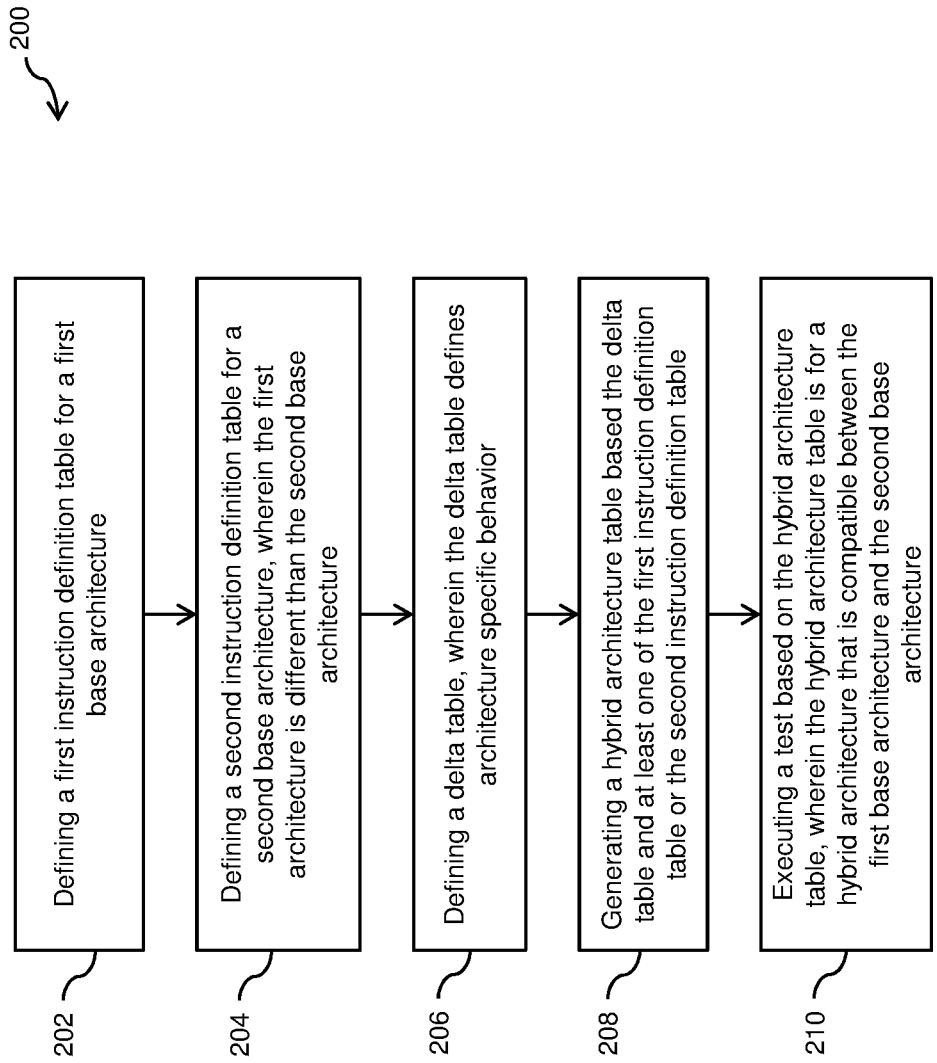
FIG. 2 is a flow diagram illustrating an embodiment for testing a hybrid architecture instruction set.

Referring now to FIG. 2, a flow diagram 200 of an embodiment for testing a hybrid architecture instruction set is shown. Block 202 provides defining a first instruction definition table for a first base architecture. In one or more embodiments, the instruction definition table is derived from the base architecture. The base architecture can be for an s/390 architecture, z/Architecture, or any other architecture based instruction set. Block 204 provides defining a second instruction definition table for a second base architecture, wherein the first architecture is different than the second base architecture.

Block 206 of flow diagram 200 includes defining a delta table, wherein the delta table defines architecture specific behavior. Example behaviors can affect operations including how data is written and read from storage. The delta table can be defined manually by a system operating, where the delta tables describes how a specific instruction of a base architecture will behave in the resulting hybrid architecture. In one or more embodiment, at least one delta table is used to modify the instructions of the base architecture.

Block 208 provides generating a hybrid architecture table based on the delta table and at least one of the first instruction definition table or the second instruction definition table. Block 210 provides executing a test based on the hybrid architecture table, wherein the hybrid architecture table is for a hybrid architecture that is compatible between the first base architecture and the second base architecture. In one or more embodiments, the hybrid architecture operates in a compatible mode between a first architecture and a second architecture where the compatible mode supports a legacy architecture. For example, a compatible mode for s/390 would allow for a number of programs of the legacy s/390 architecture to operate in a z/Architecture. The hybrid architecture will provide the framework for testing the simulations of the system.

Figure 3:
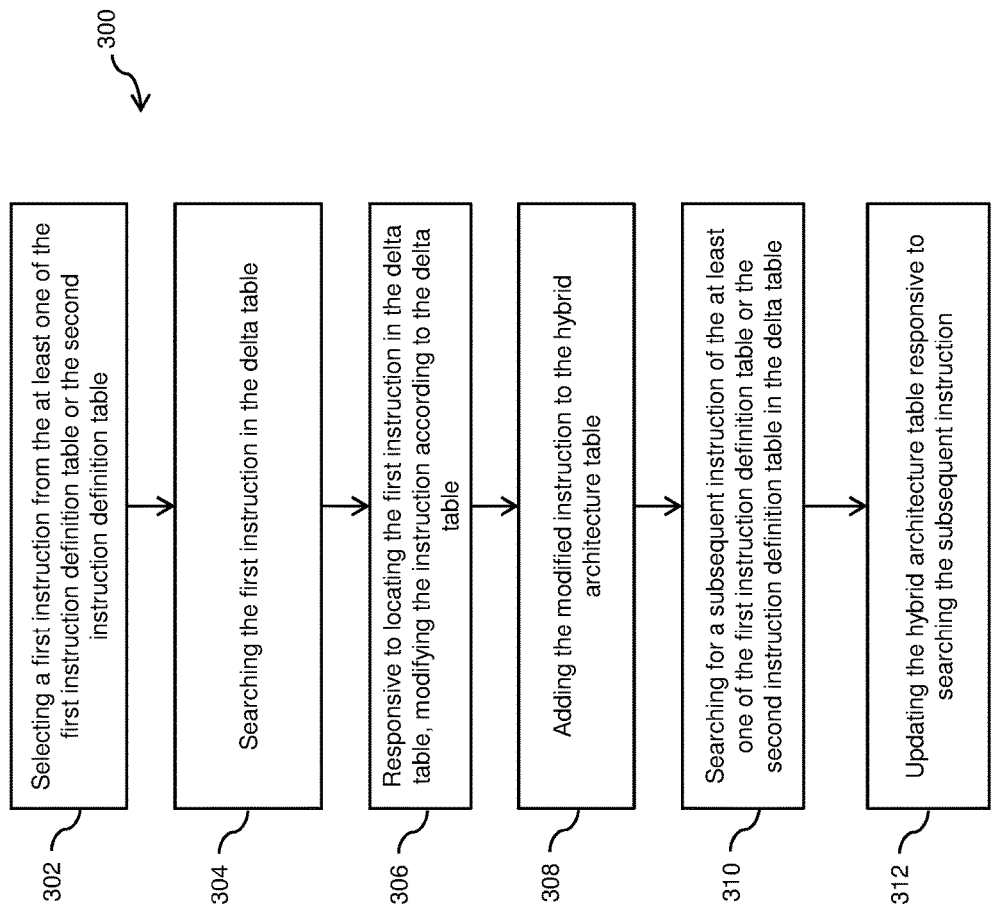
FIG. 3 is a flow diagram illustrating an embodiment for testing a hybrid architecture instruction set.

Now referring to FIG. 3, a flow diagram 300 for testing a hybrid architecture instructions set is shown. Block 302 provides selecting a first instruction from the at least one of the first instruction definition table or the second instruction definition table.

Block 304 provides searching the first instruction in the delta table. Block 306 provides responsive to locating the first instruction in the delta table, modifying the instruction according to the delta table. If the selected first instruction exists in the delta table, the instruction will be modified before being saved in the hybrid architecture table.

Block 308 provides adding the modified instruction to the hybrid architecture table. In an embodiment, the hybrid architecture is generated by adding a modified instruction that has been located in the delta table to the hybrid table. Otherwise, for an instruction that does not exist in the delta table, the instruction without modification will be added to the hybrid architecture table. Block 310 includes repeating the searching for a subsequent instruction of the at least one of the first instruction definition table or the second instruction definition table in the delta table. In one or more embodiments, each instruction of a base architecture will be searched in the delta table line-by-line until there are no remaining instructions in the base architecture that have not been searched in the delta table.

Block 312 provides updating the hybrid architecture table responsive to searching the subsequent instruction. After searching each instruction in the delta table, the instruction will be added to the hybrid table, either in original form or modified form based on the delta table, to form the final set of instructions for testing the hybrid architecture.

Figure 4:
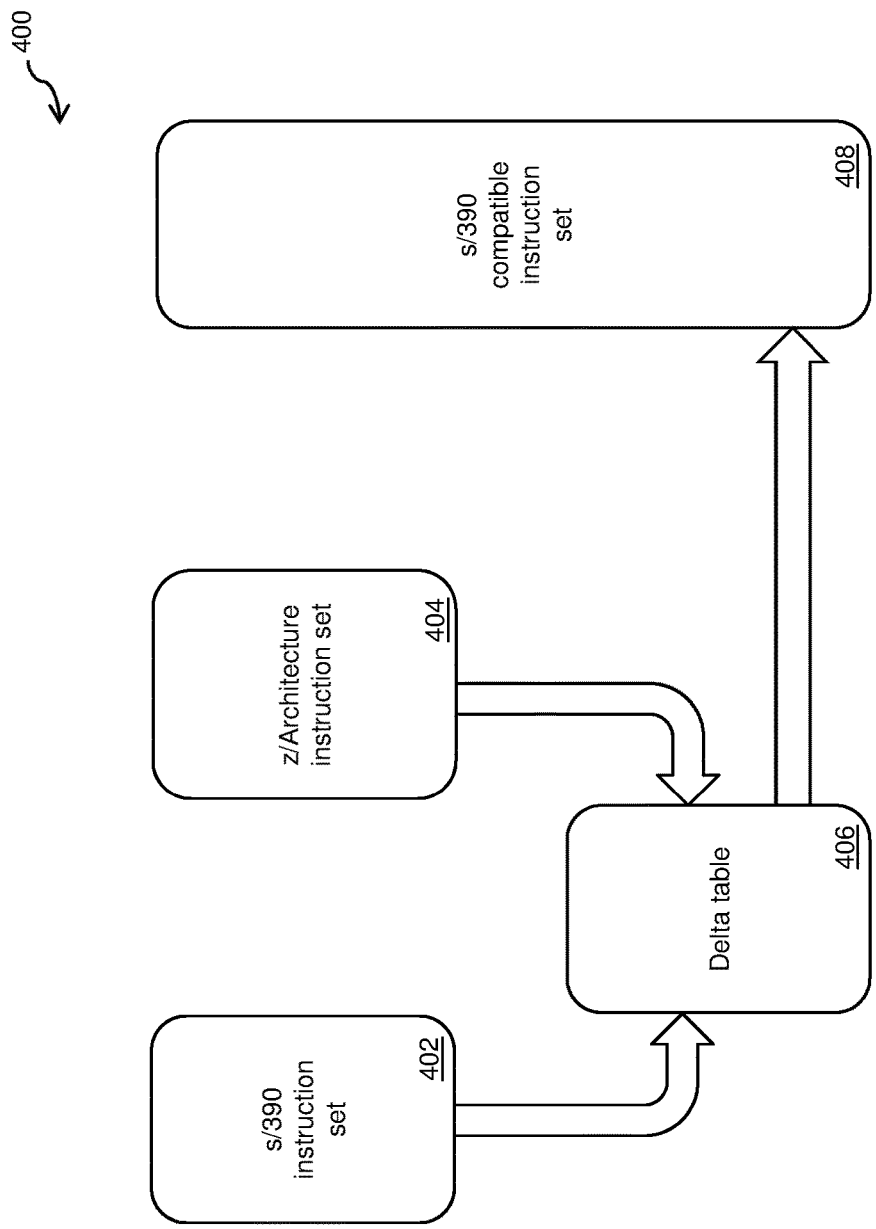
FIG. 4 is a block diagram illustrating an embodiment for testing a hybrid architecture instruction set.

Referring now to FIG. 4, a block diagram 400 for testing a hybrid architecture instruction set is shown. An s/390 instruction set 402 represents a first base architecture and the z/Architecture instruction set 404 represents a second base architecture. The delta table 406 includes descriptions of how specific architecture behavior will operate under the hybrid architecture. The s/390 compatible instruction set 408 represents a hybrid architecture which was generated based on the delta table 406 and the tables including instruction sets 402, 404. The s/390 compatible instruction set 408 is used during testing. The hybrid instruction set is generated to create the final set of instructions to be supported in s/390-compatible mode.

Figure 5:
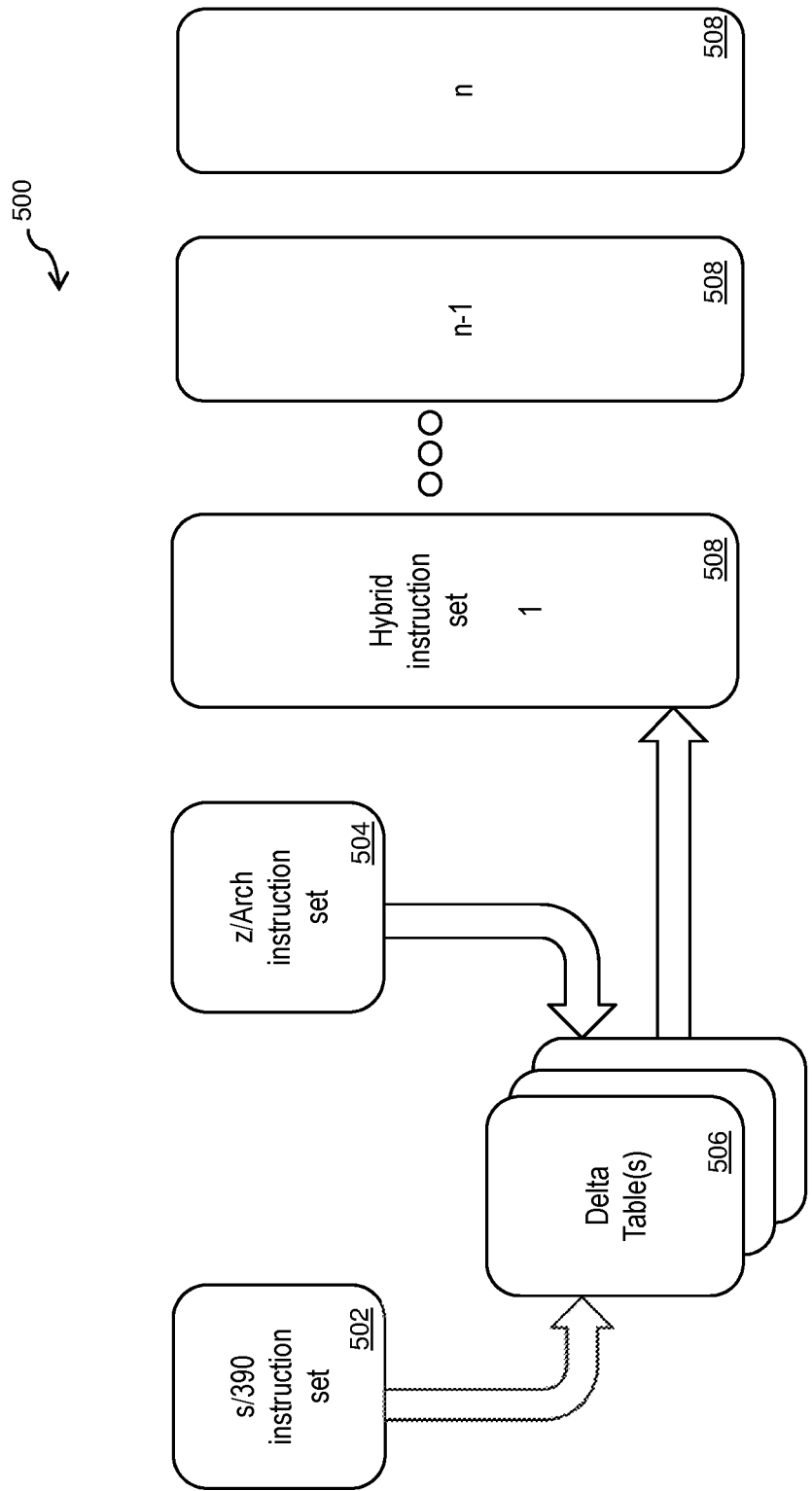
FIG. 5 is a block diagram illustrating another embodiment for testing a hybrid architecture instruction set.

Now referring to FIG. 5, a block diagram 500 for testing a hybrid architecture instruction set is shown. FIG. 5, similar to FIG. 4, provides a first instruction set 502 and second instruction set 504, wherein the first instruction set is for the s/390 architecture and the second instruction set is for the z/Architecture. Delta table(s) 506 includes instructions that describe how architecture specific behavior will be modified in a hybrid architecture. Hybrid instruction set(s) 508 depict the plurality of resulting hybrid instructions sets that are based on the delta tables 506 and base architectures 502, 504. The hybrid architecture instructions will be used to test the compatible mode of the system.

Figure 6:
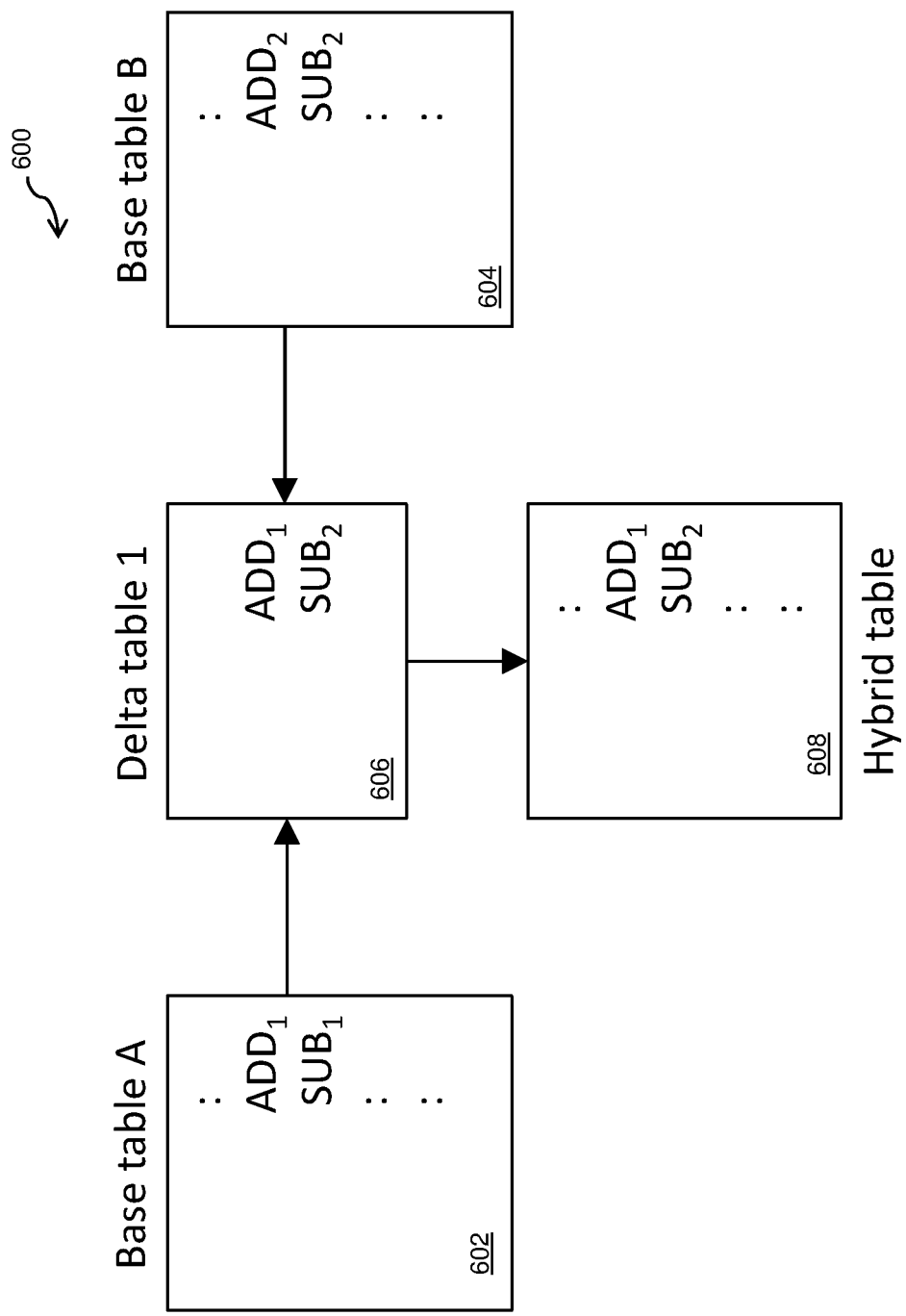
FIG. 6 is a block diagram illustrating an example of an embodiment for testing a hybrid architecture instruction set.

Referring now to FIG. 6, a block diagram 600 for testing a hybrid architecture instruction set is shown. Architecture definition table A 602 represents a base architecture A. The architecture definition table A 602 includes a plurality of instructions. These instructions include an ADD1 and SUB1 instructions, addition and subtraction instructions, respectively. Architecture definition table B 604 represents a base architecture B. The architecture definition table B 604 includes a plurality of instructions including ADD2 and SUB2. Each base architecture defines these instructions separately. For example, one base architecture may add/subtract 32-bit numbers while the other base architectures add/subtract 64-bit numbers.

Block diagram 600 depicts a delta table 606. Delta tables are manually generated based on the base architectures. In another embodiment, a plurality of delta tables can be used. The delta table describes how an instruction of a base table will be modified in the hybrid architecture. In one or more embodiments, the delta tables will be used to modify the identified instructions prior to adding the instruction to the hybrid architecture table. In an example, the delta table 606, defines that the ADD instruction should be used as defined by base architecture definition table A 602, while the SUB instruction should be used as defined by base architecture definition table B 604.

Hybrid architecture table 608 includes instructions that have been added based on the base architecture definition table 602, 604 and the delta table 606. In an example, if base architecture A is selected, the hybrid table will be generated by adding the subtract from table B. Similarly, if the base architecture B is used, the ADD instruction will be added to the hybrid table from table A. The hybrid architecture tables are generated based on both the base architecture definition tables and the delta tables.

Figure 7:
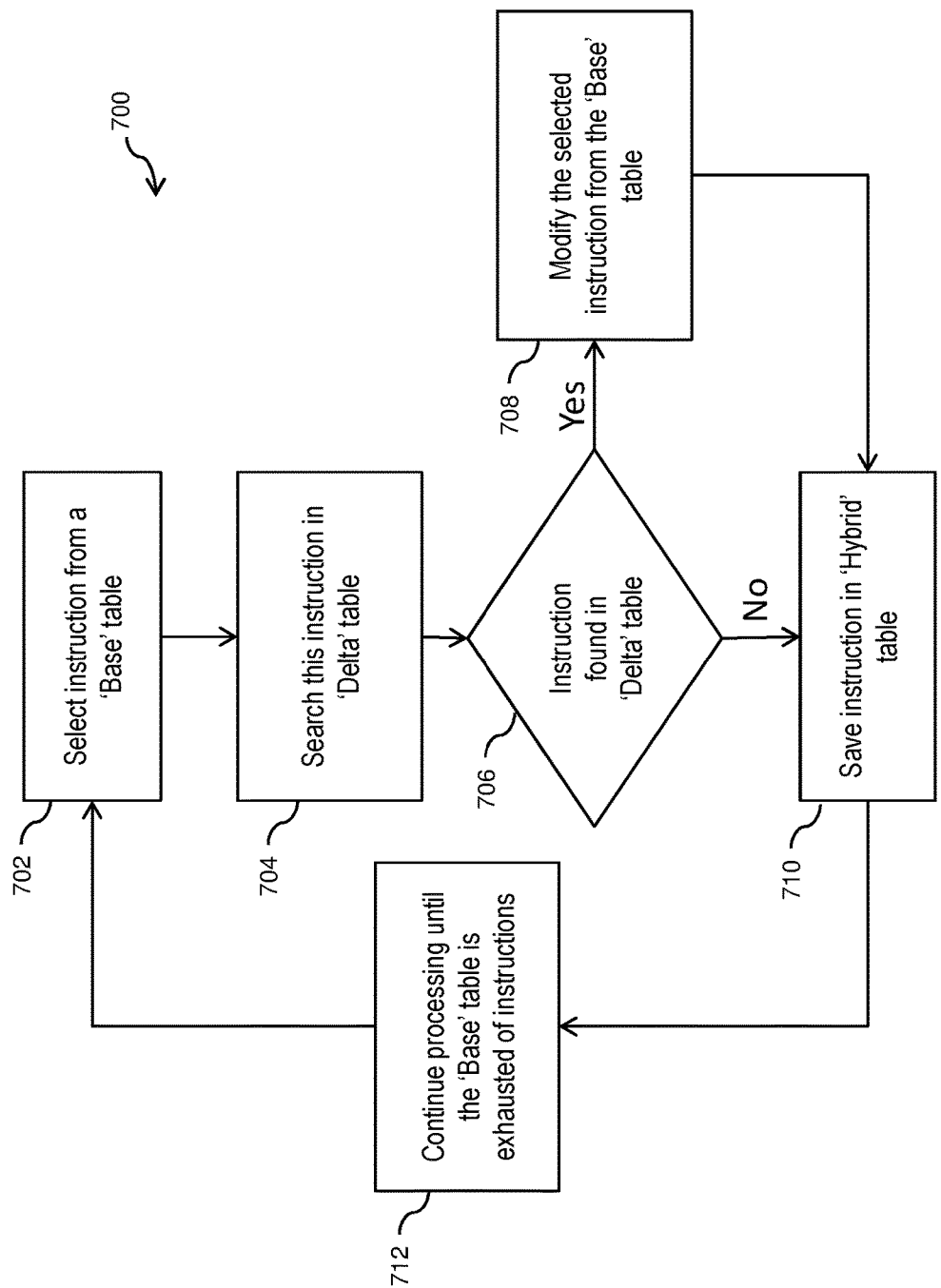
FIG. 7 is a flow diagram illustrating an embodiment for testing a hybrid architecture instruction set.

Referring now to FIG. 7, a flow diagram 700 is shown. After each architecture definition table (base table) has been generated for each Base architecture and the Delta table has been defined, as shown in block 702, an instruction is selected from a Base table. Block 704 provides searching the selected instruction in the Delta table, and decision block 706 determines whether the selected instruction is found in the Delta table. If so, block 708 provides modifying the selected instruction from the Base table. After the selected instruction is modified, the modified instruction is saved in the Hybrid table. In one or more embodiments, an instruction may be modified by redefining the instruction's "itext" field, redefining the types of exceptions the instruction is subject to, and redefining entry pointers for building and simulating the instruction. If not, block 710 provides saving the selected instruction in the Hybrid table. In one or more embodiments, if the instruction is to run under a non-hybrid architecture during testing, its instructions from the Base table will be used, where the Delta definition has no effect on the instruction to run in the non-hybrid architecture. Block 712 provides that the process continues until the Base table is exhausted of instructions and each instruction of the Base table has been searched in the Delta table.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for testing a hybrid architecture instruction set, the method comprising:
   defining a first instruction definition table for a first base architecture;
   defining a second instruction definition table for a second base architecture, wherein the first base architecture is different than the second base architecture;
   defining a delta table;
   generating a hybrid architecture table based on the delta table; and
   executing a test based on the hybrid architecture table.

2. The method of claim 1, wherein the generating the hybrid architecture table comprises,
   selecting a first instruction from the at least one of the first instruction definition table or the second instruction definition table;

searching the first instruction in the delta table;
responsive to locating the first instruction in the delta table, modifying the instruction according to the delta table;
adding the modified instruction to the hybrid architecture table; and
searching for a subsequent instruction of the at least one of the first instruction definition table or the second instruction definition table in the delta table; and
updating the hybrid architecture table responsive to searching the subsequent instruction.

3. The method of claim 2, wherein if the first instruction is absent from the delta table, adding the first instruction to the hybrid architecture table.

4. The method of claim 1, wherein the delta table comprises a plurality of instructions.

5. The method of claim 1, wherein the first architecture is an s/390 architecture and the second architecture is a z/Architecture.

6. The method of claim 1, wherein when simulating a test for a non-hybrid architecture, using an instruction from the at least one of the first architecture definition table or the second architecture definition table, otherwise performing the test based on the hybrid architecture table.

7. The method of claim 1, wherein a plurality of architecture definition tables and a plurality of delta tables are used for generating the hybrid architecture table.

8. A computer program product for testing a hybrid architecture instruction set, the computer program product comprising:
a computer readable storage medium having stored thereon first program instructions executable by a processor to cause the processor to:
define a first instruction definition table for a first base architecture;
define a second instruction definition table for a second base architecture, wherein the first base architecture is different than the second base architecture;
define a delta table;
generate a hybrid architecture table based on the delta table; and
execute a test based on the hybrid architecture table.

9. The computer program product of claim 8, wherein generating the hybrid architecture table comprises,
select a first instruction from the at least one of the first instruction definition table or the second instruction definition table;
search the first instruction in the delta table;
responsive to locating the first instruction in the delta table, modifying the instruction according to the delta table;
add the modified instruction to the hybrid architecture table; and
search for a subsequent instruction of the at least one of the first instruction definition table or the second instruction definition table in the delta table; and
update the hybrid architecture table responsive to searching the subsequent instruction.

10. The computer program product of claim 9, wherein if the first instruction is absent from the delta table, adding the first instruction to the hybrid architecture table.

11. The computer program product of claim 8, wherein the delta table comprises a plurality of delta tables.

12. The computer program product of claim 8, wherein the first architecture is a s/390 architecture and the second architecture is a z/architecture.

13. The computer program product of claim 8, wherein when simulating a test for a non-hybrid architecture, using an instruction from the at least one of the first architecture definition table or the second architecture definition table, otherwise performing the test based on the hybrid architecture table.

14. The computer program product of claim 8, wherein a plurality of base architectures and a plurality of delta tables are used for generating the hybrid architecture table.

15. A system for testing a hybrid architecture instruction set, the system comprising:
a storage medium, the storage medium being coupled to a processor;
the processor configured to:
define a first instruction definition table for a first base architecture;
define a second instruction definition table for a second base architecture, wherein the first base architecture is different than the second base architecture;
define a delta table;
generate a hybrid architecture table based on the delta table; and
execute a test based on the hybrid architecture table.

16. The system of claim 15, wherein generating the hybrid architecture table comprises,
select a first instruction from the at least one of the first instruction definition table or the second instruction definition table;
search the first instruction in the delta table;
responsive to locating the first instruction in the delta table, modifying the instruction according to the delta table;
add the modified instruction to the hybrid architecture table; and
search for a subsequent instruction of the at least one of the first instruction definition table or the second instruction definition table in the delta table; and
update the hybrid architecture table responsive to searching the subsequent instruction.

17. The system of claim 16, wherein if the first instruction is absent from the delta table, adding the first instruction to the hybrid architecture table.

18. The system of claim 15, wherein the first architecture is for a s/390 architecture and the second architecture is a z/architecture.

19. The system of claim 15, wherein when simulating a test for a non-hybrid architecture, using an instruction from the at least one of the first architecture definition table or the second architecture definition table, otherwise performing the test based on the hybrid architecture table.

20. The system of claim 15, wherein a plurality of base architectures and a plurality of delta tables are used for generating the hybrid architecture table.

* * * * *